US012792961B2

(12) United States Patent
Golconda et al.

(10) Patent No.: US 12,792,961 B2
(45) Date of Patent: Nov. 10, 2026

(54) ENHANCING NEAREST NEIGHBOR ALGORITHM USING A SET OF PARALLEL MODELS

(71) Applicant: Oracle International Corporation, Redwood Shores, CA (US)

(72) Inventors: Suresh Kumar Golconda, Fremont, CA (US); Nickolas Kavantzas, Emerald Hills, NH (US); Neha Tomar, Bangalore (IN); Lubomir Nerad, Redwood Shores, CA (US); Abhinav Kumar, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 680 days.

(21) Appl. No.: 18/314,880

(22) Filed: May 10, 2023

(65) Prior Publication Data

US 2024/0378489 A1 Nov. 14, 2024

(51) Int. Cl.
*G06N 20/00* (2019.01)

(52) U.S. Cl.
CPC .................................... *G06N 20/00* (2019.01)

(58) Field of Classification Search
CPC ...................................................... G06N 20/00
See application file for complete search history.

(56) References Cited

U.S. PATENT DOCUMENTS

2018/0336479 A1* 11/2018 Guttmann ............ G06V 10/764
2019/0065989 A1* 2/2019 Kida ........................ G06N 3/08

OTHER PUBLICATIONS

"Random subspace and random projection nearest neighbor ensembles for high dimensional data" (Year: 2022).*
García-Pedrajas, "Boosting k-nearest neighbor classifier by means of input space projection" (Year: 2009).*
Baoli Li, "Distance Weighted Cosine Similarity Measure for Text Classification" (Year: 2013).*

* cited by examiner

*Primary Examiner* — Kamran Afshar
*Assistant Examiner* — Majd Maher Haddad
(74) *Attorney, Agent, or Firm* — Invoke

(57) ABSTRACT

The present disclosure relates to systems and methods for enhancing computer services with parallel models. A training dataset can be generated. Computer models can be trained using the training dataset. Second data can be partitioned into a set of data subsets. Each data subset can be allocated to a different computer model. Projections of data points can be generated by executing each computer model using a corresponding data subset. Relative differences between the projections can be determined. An output of the computer models can be provided by aggregating the projections of data points.

20 Claims, 9 Drawing Sheets

ENHANCING NEAREST NEIGHBOR ALGORITHM USING A SET OF PARALLEL MODELS

TECHNICAL FIELD

The present disclosure relates generally to computer operations. More particularly, the present disclosure relates to systems and methods that involve using a set of parallel models to enhance a nearest neighbor algorithm.

BACKGROUND

Computer services, such as a computer algorithm or other computer operations, can be designed and/or generated to perform one or more tasks such as querying a database, searching various databases for content strings, rendering a webpage, and the like. As the volume and frequency of data transfer exponentially increases, the computer services may not perform the one or more tasks adequately. For example, the computer services may return incorrect results, may return results after an excessive amount of time, etc. Enhancing a performance of the computer services to be able to address and/or handle the exponentially increasing volume and frequency of data transfer can be difficult.

SUMMARY

In some embodiments, a computer-implemented method is provided for enhancing a computer service using a set of models. A training dataset can be generated by preprocessing a first set of data into the training dataset that includes a set of training data subsets. A set of nearest neighbor models that includes a first number of models can be trained. The training dataset can be partitioned into a set of training subsets. The set of training subsets can include a second number of training subsets, and the second number may be the same as the first number. A first training data subset of the set of training subsets may correspond to a first feature space of a set of feature spaces determined by a computing device. A second training data subset of the set of training data subsets may correspond to a second feature space of the set of feature spaces, and the first feature space may be compatible with the second feature space such that features from the first feature space can be combined with features from the second feature space. A set of projections of data points into a corresponding feature space can be determined for each training subset of the set of training subsets, and the data points can be included in the training subset. A set of training features can be extracted from the set of training subsets. The set of training features may include one or more training feature subsets, and the one or more training feature subsets can each include one or more indications of similarity between the projections of data points included in a common training subset of the set of training subsets. Each nearest neighbor model of the set of nearest neighbor models can be trained using a different training feature subset of the one or more training feature subsets. A second set of data can be partitioned into a set of interaction data subsets that can include a third number of data subsets. The third number may be the same as the first number. Each interaction data subset of the set of interaction data subsets can be allocated to a different nearest neighbor model of the set of nearest neighbor models. A plurality of projections of data points can be generated by executing each nearest neighbor model of the set of nearest neighbor models using a corresponding interaction data subset of the set of interaction data subsets. The set of projections of data points can include a set of projection subsets. Each projection subset of the set of projection subsets can correspond to a different nearest neighbor model of the set of nearest neighbor models, and each projection subset can have a corresponding feature space of the set of feature spaces. A set of relative differences between each projection of the set of projection subsets can be determined for each set of projection subsets. An output of the set of nearest neighbor models can be provided by aggregating the set of projections of data points.

In some embodiments, a number of nearest neighbor models to include in the set of nearest neighbor models can be determined based on a number of available computational resources.

In some embodiments, a number of nearest neighbor models to include in the set of nearest neighbor models can be determined based on a size of the training dataset.

In some embodiments, determining the number of nearest neighbor models to include in the set of nearest neighbor models can include: determining an optimal size for each training data subset of the plurality of training data subsets; and determining the number of nearest neighbor models to include in the set of nearest neighbor models to correspond to the optimal size for each training data subset of the set of training data subsets.

In some embodiments, providing the output of the set of nearest neighbor models can include: determining a set of weights, each weight of the set of weights corresponding to a different projection of the set of projections of data points; and applying the set of weights to the set of projections of data points to resolve relative differences included in the set of projections.

In some embodiments, the one or more indications of similarity between the projections of data points included in a common training subset of the set of training subsets includes one or more cosine similarities, one or more Minkowski distances, or one or more Jaccard similarities between the projections of data points included in a common training subset of the set of training subsets.

In some embodiments, determining the set of relative differences between each projection of the plurality of projection subsets can include determining a cosine similarity, a Minkowski distance, or a Jaccard similarity between each projection included in a respective projection subset of the set of projection subsets.

In some embodiments, a computer-program product is provided that is tangibly embodied in a non-transitory machine-readable storage medium and that includes instructions configured to cause one or more data processors to perform various operations. The operations can include generating a training dataset by preprocessing a first set of data into the training dataset that includes a set of training data subsets. The operations can include training, using the training dataset, a set of nearest neighbor models that includes a first number of models. The operations can include partitioning the training dataset into a set of training subsets. The set of training subsets can include a second number of training subsets, and the second number can be the same as the first number. A first training data subset of the set of training subsets can correspond to a first feature space of a set of feature spaces, and a second training data subset of the set of training data subsets can correspond to a second feature space of the set of feature spaces. The first feature space may be compatible with the second feature space such that features from the first feature space can be combined with features from the second feature space. The operations can include determining, for each training subset of the set of training subsets, a set of projections of data points into a corresponding feature space. The data points can be included in the training subset. The operations can include extracting, from the set of training subsets, a set of training features that includes one or more training feature subsets. The one or more training feature subsets can each include one or more indications of similarity between the projections of data points included in a common training subset of the set of training subsets. The operations can include training each nearest neighbor model of the set of nearest neighbor models using a different training feature subset of the one or more training feature subsets. The operations can include partitioning a second set of data into a set of interaction data subsets that can include a third number of data subsets. The third number may be the same as the first number. The operations can include allocating each interaction data subset of the set of interaction data subsets to a different nearest neighbor model of the set of nearest neighbor models. The operations can include generating a set of projections of data points by executing each nearest neighbor model of the set of nearest neighbor models using a corresponding interaction data subset of the set of interaction data subsets. The set of projections of data points can include a set of projection subsets, and each projection subset of the set of projection subsets can correspond to a different nearest neighbor model of the set of nearest neighbor models. Each projection subset may have a corresponding feature space of the set of feature spaces. The operations can include determining, for each set of projection subsets, a set of relative differences between each projection of the set of projection subsets. The operations can include providing an output of the set of nearest neighbor models by aggregating the plurality of projections of data points.

In some embodiments, a system is provided that includes one or more data processors and a non-transitory computer readable storage medium including instructions which, when executed on the one or more data processors, cause the one or more data processors to perform various operations. The system can generate a training dataset by preprocessing a first set of data into the training dataset that includes a set of training data subsets. The system can train, using the training dataset, a set of nearest neighbor models that includes a first number of models. The system can partition the training dataset into a set of training subsets. The set of training subsets can include a second number of training subsets, and the second number may be the same as the first number. A first training data subset of the set of training subsets can correspond to a first feature space of a set of feature spaces determined by the computing device, and a second training data subset of the plurality of training data subsets can correspond to a second feature space of the set of feature spaces. The first feature space may be compatible with the second feature space such that features from the first feature space can be combined with features from the second feature space. The system can determine, for each training subset of the set of training subsets, a set of projections of data points into a corresponding feature space. The data points can be included in the training subset. The system can extract, from the set of training subsets, a set of training features that can include one or more training feature subsets. The one or more training feature subsets can each comprise one or more indications of similarity between the projections of data points included in a common training subset of the set of training subsets. The system can train each nearest neighbor model of the set of nearest neighbor models using a different training feature subset of the one or more training feature subsets. The system can partition a second set of data into a set of interaction data subsets that can include a third number of data subsets. The third number may be the same as the first number. The system can allocate each interaction data subset of the set of interaction data subsets to a different nearest neighbor model of the set of nearest neighbor models. The system can generate a set of projections of data points by executing each nearest neighbor model of the set of nearest neighbor models using a corresponding interaction data subset of the set of interaction data subsets. The set of projections of data points can include a set of projection subsets, and each projection subset of the set of projection subsets can correspond to a different nearest neighbor model of the set of nearest neighbor models. Each projection subset can have a corresponding feature space of the set of feature spaces. The system can determine, for each set of projection subsets, a set of relative differences between each projection of the set of projection subsets. The system can provide an output of the set of nearest neighbor models by aggregating the plurality of projections of data points.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
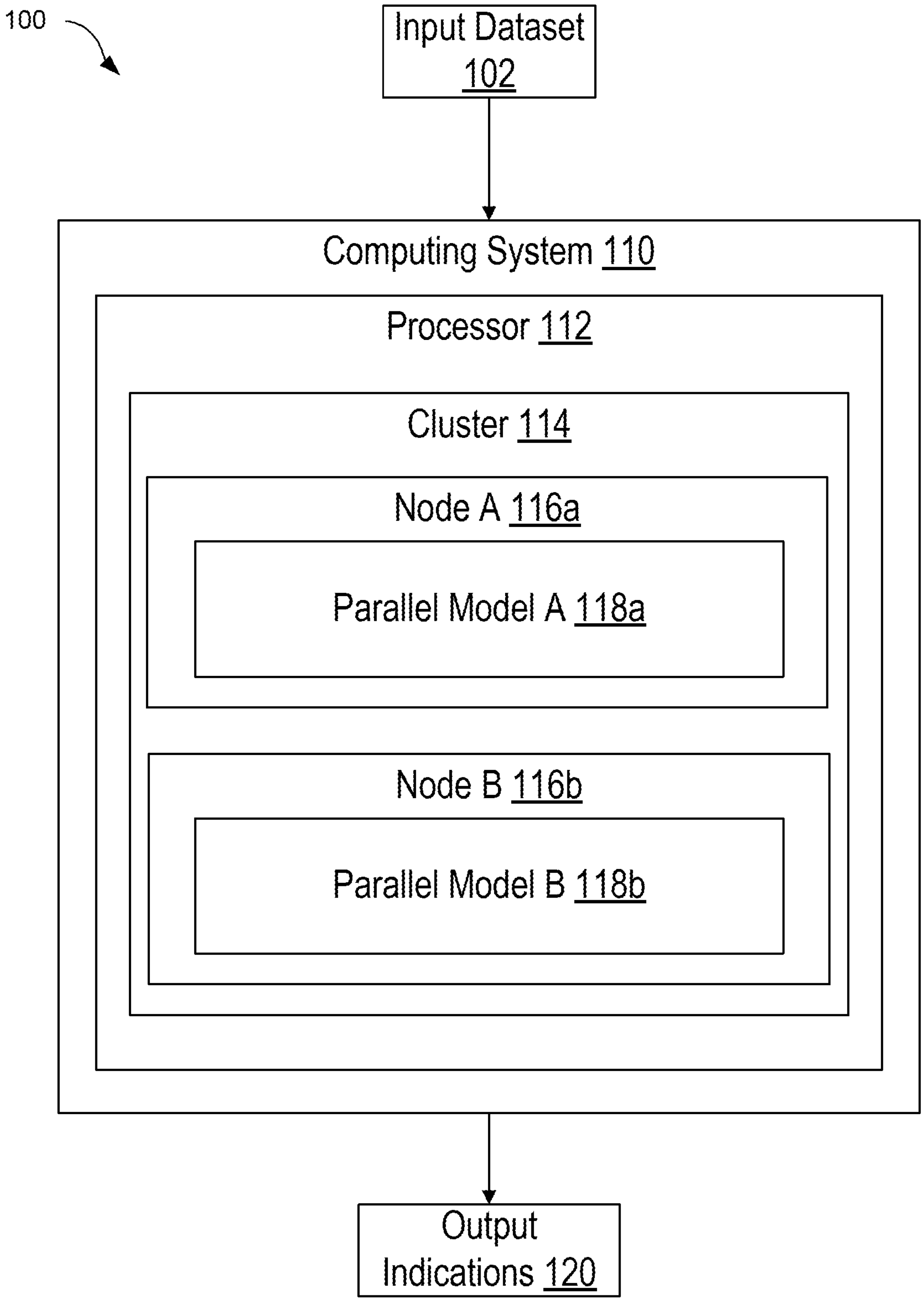
FIG. 1 is a block diagram illustrating an example of a computing environment for enhancing a nearest neighbor algorithm using a set of parallel models according to an embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Overview

Certain aspects and features of the present disclosure relate to enhancing a nearest neighbor algorithm using a set of parallel models. The set of parallel models may include one or more models that each may be or include a nearest neighbor model that may be configured to identify and/or output similar projections of data points. For example, the nearest neighbor model may receive, as input, a set of indications of data points, the nearest neighbor model may project the set of indications into a feature space, and the nearest neighbor model may identify or output a subset of projections of the set of indications that are similar and/or identical to one another. In some embodiments, the nearest neighbor model may additionally output a similarity score between each projection of the subset of projections. The set of parallel models may have corresponding feature spaces that are compatible with one another such that a first output from a first parallel model of the set of parallel models may be combined with a second output from a second parallel model of the set of parallel models without losing data volume or data quality.

As used herein, "parallel model" or phrases indicating that one or more computer models, computer algorithms, computer services, and the like ("models") are parallel with respect to one another may indicate that the models can be configured to be executed substantially contemporaneous with respect to one another. The models may be configured to be executed concurrently, sequentially, or a combination thereof on different or similar processors, clusters, nodes, cores, or any combination thereof. Additionally or alternatively, the models may be parallel at a bit-level, at an instruction-level, at a data-level, at a task-level, or any combination thereof. In one particular example, two or more instances of a substantially identical computer model can be parallelized by assigning each instance of the two or more instances to different cores of a processor such that each instance can be concurrently executed. In a different particular example, each instance of the two or more instances of the substantially identical computer model can be allocated to a similar cluster to be executed separately and sequentially. Additionally, while described generally with respect to nearest neighbor algorithms, the techniques disclosed herein can be applied to other suitable computer-based models.

The volume and frequency of data storage that exists and data transfer that is occurring has drastically increased over the past decade and will likely continue to exponentially increase. In some embodiments, data storage may be used by entity to comply with various rules and/or regulations, and data transfer may be used by an entity to engage in an interaction with a different entity. One or more computer services can be used to query data storage, facilitate data transfer, etc. The one or more computer services may be or include traditional computer algorithms, artificial intelligence, such as one or more machine-learning models, and the like. The one or more computer services may not be configured to adequately handle querying data storage, facilitating data transfer, and the like for exponentially increasing volumes and frequencies of data storage and data transfer.

In some embodiments, a computer service can be designed and generated to operate using, for example, one node, one cluster, or other subcomponent, of a computer processor. Using the computer service to perform one or more tasks, such as querying a database, facilitating data transfer, and the like, for exponentially increasing volumes of data may cause the computer service to return results inaccurately, untimely, or a combination thereof. In one particular example, a nearest neighbor algorithm, which may be configured to output indications of projections of objects similar to input indications of objects, may take an excessive amount of time, such as more than a few seconds to minutes, hours, or longer, to generate an output in response to receiving a large amount of input.

In some embodiments, a set of parallel models can be used to enhance the nearest neighbor algorithm. The set of parallel models may include one model, two models, three models, four models, or more models. In some examples, each parallel model of the set of parallel models may be similar or identical to one or more other parallel models of the set of parallel models. In a particular example, each parallel model of the set of parallel models may be or include a nearest neighbor model that may be configured to identify similar projections of data points included in an input data set or input indications of data.

In some embodiments, a computing device can be used to implement the nearest neighbor algorithm enhanced with the set of parallel models. The computing device can receive a set of records or other types of data point. The computing device can define a set of feature spaces for the set of records. For example, the computing device can partition the set of records into subsets of the set of records. In some examples, the subsets may include one subset, two subsets, three subsets, four subsets, or more subsets. The subsets may include records of the set of records that overlap one another, or, in other examples, the subsets may include non-overlapping records of the set of records. The computing device can, for each subset of the subsets of the set of records, define a feature space corresponding to a different subset of the subsets of the set of records. The feature spaces may be different from one another, may be compatible with one another, and/or may be similar or identical to one another. For example, a first feature space corresponding to a first subset may be different than a second feature space corresponding to a second subset. The first feature space may be compatible with the second feature space such that data points in the first feature space may be able to be combined or compared with data points in the second feature space.

In some embodiments, the computing device can generate projections of the set of records. The computing device can, for each subset of the subsets of the set of records, transform the respective data points into projections in a corresponding feature space. For example, the computing device can transform data points of the first subset into projections of the data points in the first feature space, the computing device can transform data points of the second subset into projections of the data points in the second feature space, and so on. The computing device can use the projections to determine nearest neighbors for the set of records. In some embodiments, the computing device can identify projections of data points that are closest or most similar to other projections of data points without outputting information relative to the data points. The computing device can subsequently use the identification of the projections to determine information, such as a similarity, regarding data points included in the set of records.

Finding nearest neighbors, such as projections of similar records, using the computer service can be used as an approach for finding nearest neighbors, but the nearest neighbor algorithm may experience prediction time increases with increasing numbers of records in training data. The nearest neighbor algorithm may lack parallelism to use additional computing resources such as multiple cores. Real-time implementations of the nearest neighbor algorithm may depend on reducing a response time of the computer service, and the response time of the nearest neighbor algorithm may depend on the size of training data, the size of other input data, and/or the like. By using parallelism, the response time of the nearest neighbor algorithm can be decreased, and the nearest neighbor algorithm can be enhanced.

The nearest neighbor algorithm can, for example instead of training a single model, train multiple, smaller models, such as the set of parallel models, to enhance a performance of the nearest neighbor algorithm. The smaller models may be trained with feature spaces that facilitate merging of outputs from the smaller models. The results from the smaller models can be merged without losing quality of the result compared to merging results from smaller models with incompatible feature spaces. The training and scoring of the smaller models can be parallelized to reduce training times and/or scoring times. Additionally, the architecture of the computer service can reduce the training times and/or the scoring times by using multiple cores of the node by creating multiple threads. The computer service can be further scaled to use cores from multiple nodes, such as multiple nodes of a cluster, over a spark framework while using some advanced features such as broadcasting and buffer machine-learning models and data across nodes.

To ensure results from the models can be aggregated, a common data feature generation step, or steps, can be performed using the input dataset, for example prior to partitioning of the input dataset. Thus, a feature set's definition can be uniform for the data of the input dataset (steps such as data scalar, TFIDF etc.). The input data can be divided into multiple (N) subsets, for example by splitting by rows. The multiple subsets may be overlapping or may be unique relative to one another. Each subset can be used to train a separate model of the computer service in parallel. In examples in which the computer service is configured to determine nearest neighbors, the models can measure the distance between projections of a pair of records in units such as cosine similarity, which may depend on the features of the pair of records, such that the distances returned by any of the models can be comparable.

Example of Computing Environments for Enhancing a Nearest Neighbor Algorithm

FIG. 1 is a block diagram illustrating an example of a computing environment 100 for enhancing a nearest neighbor algorithm using a set of parallel models according to an embodiment. As illustrated, the computing environment 100 includes at least an input dataset 102, a computing system 110, and output indications 120, though the computing environment 100 may include additional or alternative components configured for enhancing the nearest neighbor algorithm.

The input dataset 102 may include historical data, real-time data, or a combination thereof. For example, the input dataset 102 may be or include historical interaction data between entities. In another example, the input dataset 102 may be or include data from a data store that is accessed substantially contemporaneously with respect to storing the data, querying the data, or the like. The computing system 110 may receive the input dataset 102 from a data store, from a request to process submitted by an entity, or from other sources of the input dataset 102. In other examples, the computing system 110 may receive a request (e.g., a query, an SQL request, etc.) to process or otherwise interact with the input dataset 102, and the computing system 110 can access a data store or otherwise generate and submit a query to access and receive the input dataset 102.

In some embodiments, the input dataset 102 can include a training dataset, can include an inference dataset, or a combination thereof. In examples in which the input dataset 102 is or includes the training dataset, the computing system 110 may receive and preprocess the input dataset 102. For example, the computing system 110 can partition the input dataset 102 into a set of training data subsets. Partitioning the input dataset 102 may involve separating the data included in the input dataset 102 into a set of training data subsets. Each training data subset included in the set of training data subsets may overlap, may partially overlap, may be separate and distinct, or any combination thereof. In a particular example, the computing system 110 can partition the input dataset 102 into n training data subsets that are separate and distinct from one another.

In examples in which the input dataset 102 is or includes the inference dataset, the computing system 110 may partition the input dataset 102 into a set of inference data subsets. Partitioning the input dataset 102 into the set of inference data subsets may involve separating the inference data included in the input dataset 102 into the set of inference data subsets such that each inference data subset included in the set of inference data subsets may overlap, may partially overlap, may be separate and distinct, or any combination thereof. In a particular example, the computing system 110 can partition the input dataset 102 into n inference data subsets that are separate and distinct from one another.

The computing system 110 can include one or more processors, such as processor 112, and other suitable components (e.g., a memory, a bus, and the like) for the computing system 110. The processor 112 may include a cluster 114, which may include one or more nodes. As illustrated, the cluster 114 of the processor 112 may include node A 116*a* and node B 116*b*, though other numbers (e.g., less than two or more than two) of nodes are possible for the cluster 114. For example, the cluster 114 may include a number of nodes similar or identical to a number of training data subsets included in the set of training data subsets or to a number of inference data subsets included in the set of inference data subsets. The computing system 110 can assign one or more of the partitioned data subsets (e.g., training or inference) from the input dataset 102 to one or more of the nodes. For example, the computing system 110 can allocate a first data subset from the input dataset 102 to node A 116*a* or any model executed thereby, and the computing system 110 can allocate a second data subset from the input dataset 102 to node B 116*b*, or any model executed thereby, for training one or more parallel models, processing the input datasets 102, or a combination thereof.

In some embodiments, the computing system 110 may assign parallel model A 118*a* to node A 116*a*, and the computing system 110 may assign parallel model B 118*b* to node B. Assigning a parallel model to a node may involve causing the respective node to process or otherwise execute the corresponding parallel model. In examples in which more than two parallel models are included in a set of parallel models for enhancing the nearest neighbor algorithm, more nodes can be requisitioned such that each parallel model of the set of parallel models can be assigned to a different node included in the cluster 114. In other examples, such as if the number of parallel models exceeds the number of available nodes on a cluster, the computing system 110 may use a different cluster, an additional cluster, or the like such that the parallel models can be processed or otherwise executed in parallel by the computing system 110.

In some embodiments, parallel model A 118*a* and parallel model B 118*b* may be or include similar or identical models. For example, parallel model A 118*a* and parallel model B 118*b* may be or include a nearest neighbor model configured to output projections of data points that are similar to one another, for example based on one or more similarity metrics. In some examples, the parallel models may have different or similar feature spaces. For example, parallel model A 118*a* may have or be associated with a first feature space, and parallel model B 118*b* may have or be associated with a second feature space. The first feature space may be different than, similar to, or identical to the second feature space. Additionally, the first feature space may, for example even if the first feature space is different than the second feature space, be compatible with the second feature space such that a first output generated based on the first feature space can be combined with a second output generated based on the second feature space. Combining the first output with the second output may not cause any data volume or data quality to be lost.

The computing system 110 may output the output indications 120 in response to executing parallel model A 118*a* and parallel model B 118*b*. In some embodiments, the computing system 110 may generate the output indications 120 by aggregating individual outputs generated by parallel model A 118*a* and parallel model B 118*b*. For example, parallel model A 118*a* may generate a first output that is or includes first indications of similarity between projections of data points included in a first data subset of the input dataset 102, and parallel model B 118*b* may generate a second output that is or includes second indications of similarity between projections of data points included in a second data subset of the input dataset 102. The computing system 110 can aggregate the first indications and the second indications to generate the output indications 120. In examples in which the input dataset 102 is preprocessed into a training dataset, the output indications 120 may be used to train parallel model A 118*a*, parallel model B 118*b*, and any other suitable parallel model. In other examples, such as examples in which the input dataset 102 is an inference dataset, the output indications 120 may represent similarities between projections of the input dataset 102 in corresponding feature spaces, and the output indications 120 can be provided to an entity. For example, the computing system 110 can provide, such as via a user interface, the output indications 120 to an entity that may have requested the output indications 120.

Figure 2:
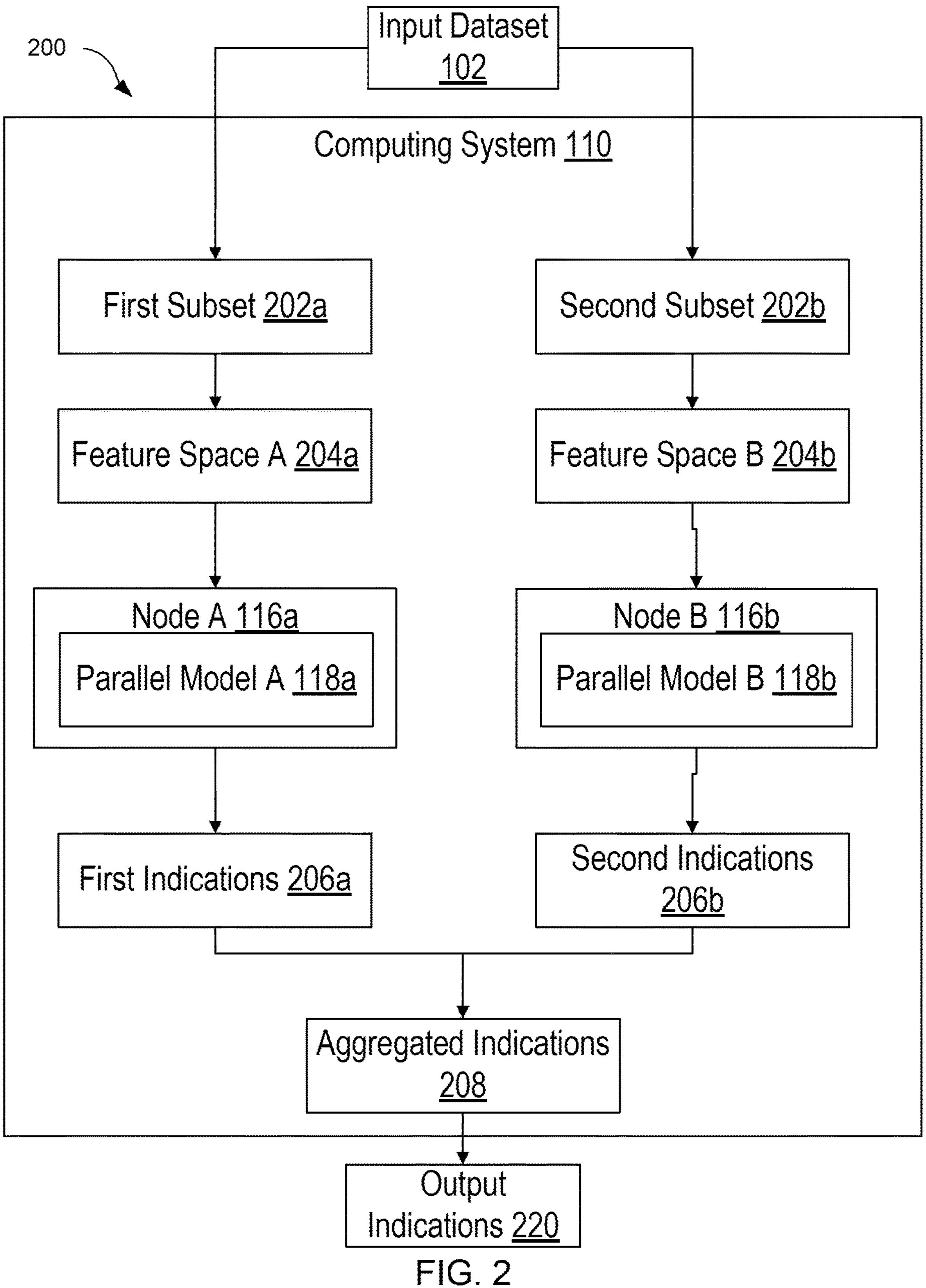
FIG. 2 is another block diagram illustrating an example of a computing environment for enhancing a nearest neighbor algorithm using a set of parallel models according to an embodiment.

FIG. 2 is another block diagram illustrating an example of a computing environment 200 for enhancing a nearest neighbor algorithm using a set of parallel models according to an embodiment. As illustrated, the computing environment 200 includes at least the input dataset 102, the computing system 110, and the output indications 120, though the computing environment 200 may include additional or alternative components configured for enhancing the nearest neighbor algorithm. Additionally, while FIG. 2 is described below with respect to an inference workflow involving the computing environment 100, the computing environment 100 may additionally or alternatively be used similarly as described below with respect to a training workflow to train one or more parallel models.

The input dataset 102 can be received by the computing system 110. For example, the computing system 110 can access a data store to receive the input dataset 102, the computing system 110 may receive the input dataset 102 from a separate computing device that transmitted the input dataset 102, or a request associated therewith, to the computing system 110, etc. The computing system 110 can partition the input dataset 102 into n number of subsets of data. In some embodiments, the subsets of data may include indications of corresponding subsets of data included in the input dataset 102, may include the corresponding subsets of data included in the input dataset 102, or the like.

In a particular example, for example in which n is two, the computing system 110 can partition the input dataset 102 into a first subset 202*a* and into a second subset 202*b*. The first subset 202*a* may overlap with the second subset 202*b*, may at least partially overlap with the second subset 202*b*, or may be separate and distinct with respect to the second subset 202*b*. In an example, the first subset 202*a* may be separate and distinct with respect to the second subset 202*b* such that no data or indications of data included in the first subset 202*a* are identical to any data or indications of data included in the second subset 202*b*.

The computing system 110 can transform the data or indications thereof from the first subset 202*a* into a first feature space 204*a*, and the computing system 110 can transform the data of indications thereof from the second subset 202*b* into a second feature space 204*b*. A feature space may be or include a set of parameters that can be used to represent the objects transformed in the feature space. For example, data or indications thereof from the first subset 202*a* can be transformed into the first feature space 204*a* such that the data or indications thereof are represented in view of the set of parameters of the first feature space 204*a*. Examples of the parameters can include (i) time, message type, severity, etc. (for examples of log messages), (ii) date stored, file type, file size, etc. (for examples of stored data), and the like.

The first feature space 204*a* may be associated with parallel model A 118*a*, and the second feature space 204*b* may be associated with parallel model B 118*b*. For example, parallel model A 118*a* may be configured to generate outputs based on data received in the first feature space 204*a*, and parallel model B 118*b* may be configured to generate outputs based on data received in the second feature space 204*b*. In some embodiments, the computing system 110 may transmit the first subset 202*a* (e.g., transformed into the first feature space 204*a*) to node A 116*a*, which may be configured to execute parallel model A 118*a*, and the computing system 110 may transmit the second subset 202*b* (e.g., transformed into the second feature space 204*b*) to node B 116*b*, which may be configured to execute parallel model B 118*b*.

Parallel model A 118*a* and parallel model B 118*b* may be similar or identical models. For example, parallel model A 118*a* and parallel model B 118*b* may be or include nearest neighbor models configured to generate indications of similarity between projections of data in corresponding feature spaces. In a particular example, parallel model A 118*a* may receive the first subset 202a, which may include projections of a subset of data from the input dataset 102 in the first feature space 204a, and may generate indications of similarity between the projections. The generated indications may be or include first indications 206a. Additionally, parallel model B 118b may receive the second subset 202b, which may include projections of a different subset of data from the input dataset 102 in the second feature space 204b, and may generate indications of similarity between the projections. The generated indications may be or include second indications 206b.

The first indications 206a may include indications of similarity between projections included in the first feature space 204a, and the second indications 206b may include indications of similarity between projections included in the second feature space 204b. In some embodiments, indications of similarity may include a distance score between each projection. The distance score may be determined by the respective parallel model by identifying the cosine distance between projections included in the respective feature space. In a particular example, if the first subset 202a includes ten different projections of data points, then parallel model A 118a may determine 45 different distance scores between different combinations of projections included in the first subset 202a. Thus, the first indications 206a may include the 45 different distance scores.

In some embodiments, the first indications 206a, the second indications 206b, or a combination thereof may omit at least a portion of the distance scores or other indications of similarity. For example, if the first indications 206a, the second indications 206b, or a combination thereof include more than 10 indications, more than 50 indications, more than 100 indications, more than 1000 indications, more than 10,000 indications, etc., the respective parallel model may select a portion of the indications to include in the first indications 206a, the second indications 206b, or a combination thereof. In a particular example, if parallel model B 118b generates 100,000 indications of similarity between projections included in the second subset 202b, parallel model B 118b may identify the top ten (e.g., most similar) indications, the top 1% (e.g., most similar) of indications, etc. to include in the second indications 206b.

In response to parallel model A 118a and parallel model B 118b generating the first indications 206a and the second indications 206b, respectively, the computing system 110 may aggregate the first indications 206a and the second indications 206b to generate aggregated indications 208. In some embodiments, aggregating the first indications 206a and the second indications 206b may involve augmenting the first indications 206a with the second indications 206b, or vice versa. In other embodiments, the computing system 110 may generate a separate file and populate the separate file with the first indications 206a and the second indications 206b to generate the aggregated indications 208. The computing system 110 may de-duplicate the aggregated indications 208 to ensure that the aggregated indications 208 does not include redundant indications. Additionally or alternatively, the computing system 110 may process the aggregated indications 208 to generate the output indications 120. Some examples of processing for the aggregated indications 208 can include ordering (e.g., from most similar to least similar) the aggregated indications 208, identifying a subset corresponding to each indication included in the aggregated indications 208, and the like.

The computing system 110 can provide the output indications 120. Providing the output indications 120 can involve transmitting the output indications 120 via a user interface or to a separate computing device for providing the output indications 120 to an entity, for example in response to a query requesting the output indications 120. In other examples, the computing system 110 can provide the output indications 120, or any indication thereof, as input for a separate computer algorithm, computer model, artificial intelligence model, and the like.

Example of Processes for Enhancing a Nearest Neighbor Algorithm

Figure 3:
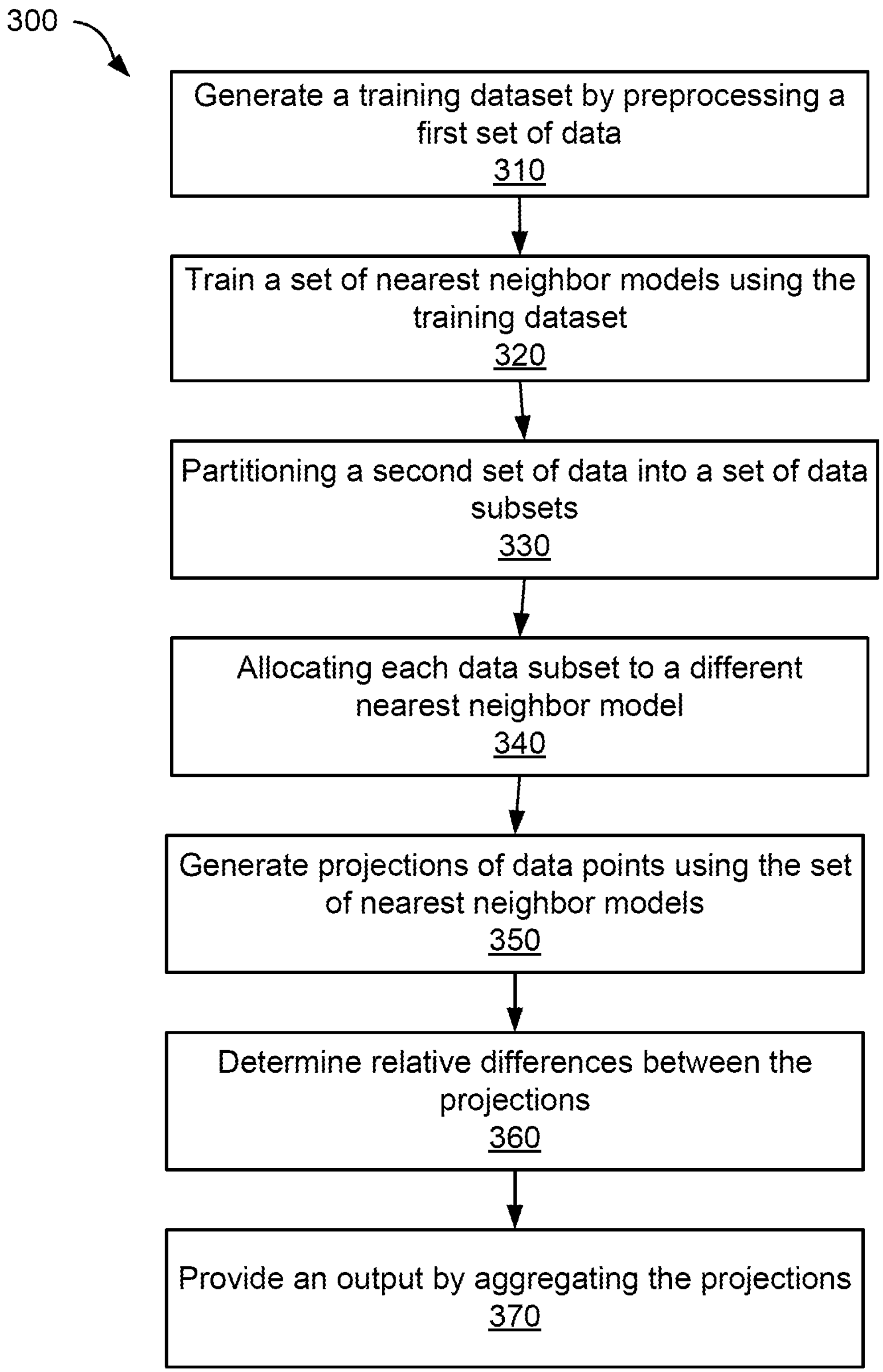
FIG. 3 is a flowchart of a process for enhancing a nearest neighbor algorithm using a set of parallel models according to an embodiment.

FIG. 3 is a flowchart of a process 300 for enhancing a computer service using a set of models according to an embodiment. The process 300 may be performed at least in part by any of the components described in the figures herein, for example, by any component of the computing environment 100 or by the computing environment 100, itself. The process 300 can begin at block 310, when the computing system 110 generates a training dataset by preprocessing a first set of data. The first set of data may be or include real-time or historical log message data, stored data on a data repository, real-time interaction data, or other types of data for the first set of data. Preprocessing the first set of data may include cleaning the first set of data, partitioning the first set of data, and the like. In some embodiments, the computing system 110 can partition the first set of data into a set of training data subsets. For example, the computing system 110 can partition the first set of data into n number of training data subsets such that n may correspond to a number of parallel models to be trained or to be used to infer information based on the first set of data.

At block 320, the computing system 110 trains a set of nearest neighbor models using the training dataset. The computing system 110 may apply the set of training data subsets to the set of nearest neighbor models to train each nearest neighbor model of the set of nearest neighbor models. For example, the computing system 110 can apply a first training data subset to a first nearest neighbor model to train the first nearest neighbor model, can apply a second training data subset to a second nearest neighbor model to train the second nearest neighbor model, and so on. The set of nearest neighbor models may be or include parallel nearest neighbor models that can be trained and executed in parallel. For example, the computing system 110 can allocate each nearest neighbor model of the set of nearest neighbor models to a different cluster, node, core, or the like of one or more processors of the computing system 110, which can execute the set of nearest neighbor models in parallel with respect to one another.

In some embodiments, the computing system 110 can determine a number of nearest neighbor models to include in the set of nearest neighbor models based on available computational resources, a size of training data subsets, etc. For example, the computing system 110 can determine the number of nearest neighbor models based on available computational resources such as available memory (e.g., static, random, etc.) available processors, available clusters, available nodes, available cores, or any combination thereof. Additionally or alternatively, the computing system 110 can determine the number of nearest neighbor models based on an optimal size of the training data subsets. For example, the computing system 110 can determine the optimal size of the training data subsets, can partition the training dataset into the number of training data subsets based on the optimal size, and can determine the number of the nearest neighbor models based on the number of training data subsets. In some embodiments, the optimal size of the training data subsets may not be uniform among the training data subsets. For example, a first training data subset may have a first optimal size, and a second training data subset may have a second optimal size that is different than the first optimal size. Additionally, while described with respect to the training dataset and training data subsets, the number of nearest neighbor models may additionally or alternatively be determined based on a size of inference data subsets, or other data subsets.

At block 330, the computing system 110 partitions a second set of data into a set of data subsets. The second set of data may be similar or different to the first set of data. For example, the second set of data may be or include inference data that may (i) be separate and distinct from the first set of data used for training the set of nearest neighbor models, or (ii) include at least partially overlapping data with respect to the first set of data. The computing system 110 can partition the second set of data into n number of data subsets such that the number of data subsets may be similar or identical to the number of training data subsets, to the number of nearest neighbor models included in the set of nearest neighbor models, or a combination thereof.

At block 340, the computing system 110 allocates each data subset of the set of data subsets to a different nearest neighbor model of the set of nearest neighbor models. Allocating a data subset to a nearest neighbor model may involve transmitting a particular data subset to a corresponding nearest neighbor model. For example, the computing system 110 may transmit a first data subset to a first nearest neighbor model, or a cluster, node, or core assigned thereto, to cause the first nearest neighbor model to process the first data subset, may transmit a second data subset to a second nearest neighbor model, or a cluster, node, or core assigned thereto, to cause the second nearest neighbor model to process the second data subset, and so on.

At block 350, the computing system 110 generates projections of data points using the set of nearest neighbor models. The data points may be included in the set of data subsets. For example, the data points may be included in, and distributed among, the first data subset, the second data subset, and so on. The computing system 110, for example via the set of nearest neighbor models, can transform the set of data subsets into projections in respective feature spaces. For example, the first nearest neighbor model can transform the data points, or indications thereof, of the first data subset into projections in a first feature space associated with the first nearest neighbor model. Additionally, the second nearest neighbor model can transform the data points, or indications thereof, of the second data subset into projections in a second feature space associated with the second nearest neighbor model, and so on. The first feature space, the second feature space, and the like may at least be compatible with one another such that outputs generated based on projections in the first feature space can be combined with outputs generated based on projections in the second feature space without losing data volume, data quality, or the like.

At block 360, the computing system 110 determines relative differences between the projections. For example, the computing system 110 may use the first nearest neighbor model, the second nearest neighbor model, and so on to determine the relative differences. The relative differences may be or include differences between projections within a common feature space. For example, the first nearest neighbor model may generate relative differences between projections included in the first feature space, the second nearest neighbor model may generate relative differences between projections included in the second feature space, and so on.

In some embodiments, the relative differences may indicate a similarity between the projections. The similarity between the projections may be determined by one or more of the set of nearest neighbor models, and the similarity may be or include a distance score, a similarity score, or the like. In some embodiments, each nearest neighbor model of the set of nearest neighbor models may determine a cosine similarity between projections of a common feature space. In a particular example, the first nearest neighbor model can determine cosine similarities between the projections in the first feature space, the second nearest neighbor model can determine cosine similarities between the projections in the second feature space, and so on. While the indications of similarity can be or include a cosine similarity score, other indications, such as Minkowski distances, Jaccard similarities, and the like, can be determined and used as the relative differences.

At block 370, the computing system 110 provides an output by aggregating the projections. The computing system 110 can combine the projections, the relative differences, or a combination thereof to generate the output. For example, the computing system 110 can generate a separate file and populate the separate file with the relative differences. Additionally or alternatively, the computing system 110 may augment a first data file that includes a first set of relative differences with a second set of relative differences, a third set of relative differences, and the like. In a particular example, the computing system 110 may generate a separate or new data file and populate the new data file with a set of first relative differences generated by the first nearest neighbor model, a set of second relative differences generated by the second nearest neighbor model, and so on. In response to aggregating the projections, or indications of relative differences thereof, the output may include indications of the projections, relative differences between the projections, and the like.

Additionally, the computing system 110 may process the output prior to or substantially contemporaneous with providing the output. For example, the computing system 110 can de-duplicate the output, can order the output, can prune the output, can normalize the output, and the like. The computing system 110 may de-duplicate the output to ensure that no redundant data is included in the output. The computing system 110 can order the output to provide a list of projections, and indications of similarities thereof, in a decreasing or increasing order of similarity between respective pairs of projections or indications thereof. The computing system 110 can prune the output to prevent an entity, or separate computing device, from being overwhelmed by an excessive amount of data. The computing system 110 can normalize the output to ensure that the data or indications thereof included in the output is comparable and useful for subsequent analysis, decision-making, etc.

Figure 4:
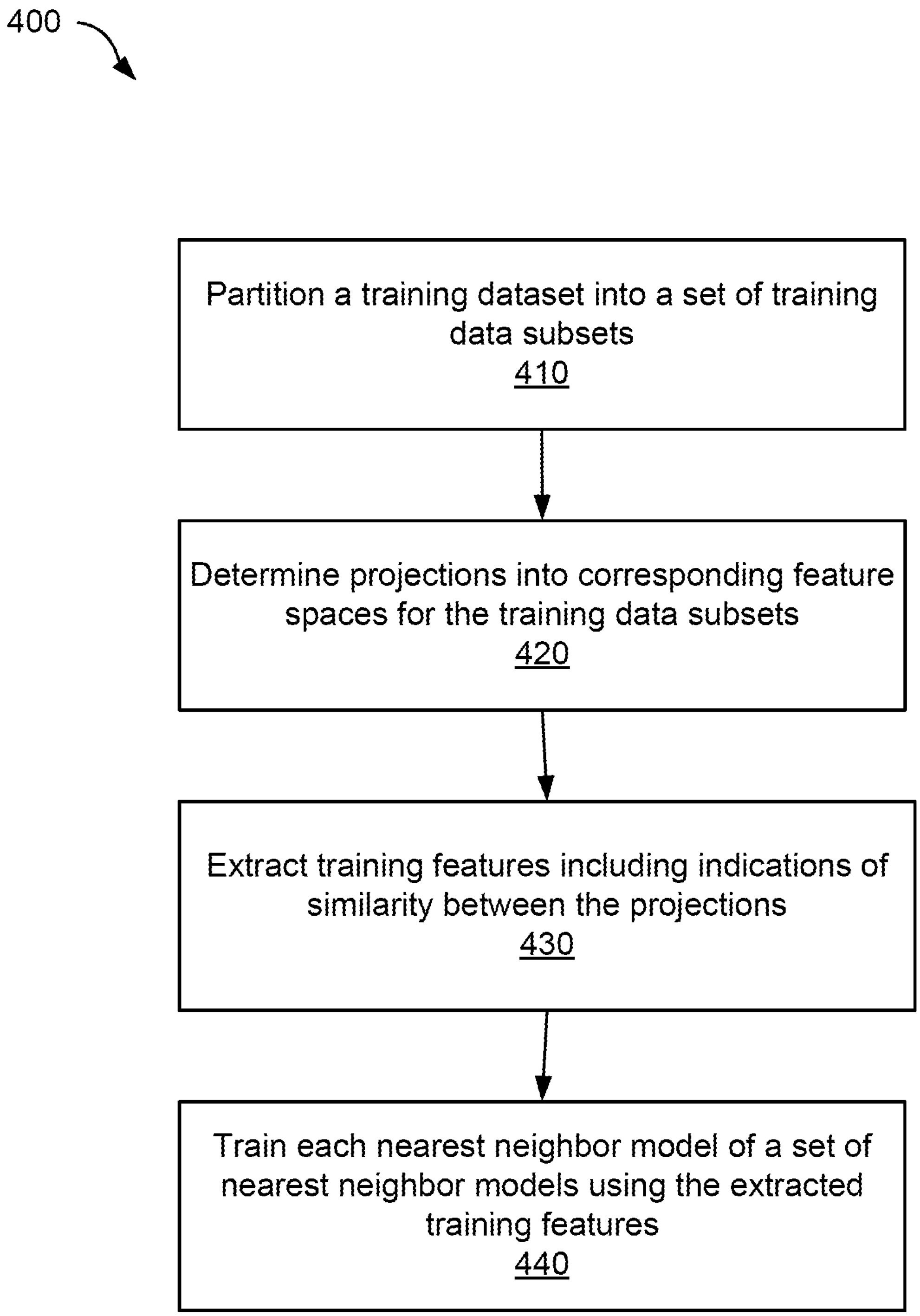
FIG. 4 is a flowchart of a process for training a set of parallel models for enhancing a nearest neighbor algorithm according to an embodiment.

FIG. 4 is a flowchart of a process 400 for training a set of parallel models for enhancing a nearest neighbor algorithm according to an embodiment. The process 400 may be performed at least in part by any of the components described in the figures herein, for example, by any component of the computing environment 100 or by the computing environment 100, itself. The process 400 can begin at block 410, when the computing system 110 partitions a training dataset into a set of training data subsets. The computing system 110 may partition the training dataset into the set of training data subsets that includes n number of training data subsets. In some embodiments, the set of training data subsets may include a similar or identical number of training data subsets as a number of nearest neighbor models of a set of nearest neighbor models of a nearest neighbor algorithm. In a particular example, if the set of nearest neighbor models includes 15 nearest neighbor models, then the computing system 110 may partition the training dataset into 15 different training data subsets.

In some embodiments, each training data subset may correspond to a different feature space of a set of feature spaces. The set of feature spaces may be determined by the computing system 110, and the computing system 110 may allocate each training data subset to a different feature space of the set of feature spaces. For example, the computing system 110 may partition the training dataset into a first training data subset and a second training data subset, and the computing system 110 may allocate the first training data subset to a first feature space of the set of feature spaces and the second training data subset to a second feature space of the set of feature spaces. In some embodiments, the computing system 110 may generate the set of feature spaces to correspond to the number of training data subsets, the number of nearest neighbor models, a combination thereof, or the like.

In some embodiments, the set of feature spaces may be compatible with one another. The computing system 110 can generate, identify, or otherwise use a first feature space, a second feature space, and so on that are compatible with one another such that outputs generated using or otherwise with respect to the different feature spaces may be combined without losing data volume, data quality, and the like. In a particular example, the first feature space may be compatible with the second feature space such that a first output generated in the first feature space may be combined with a second output generated in a second feature space, and a combination of the first output and the second output includes equal or greater amounts of data volume, data quality, etc.

At block 420, the computing system 110 determines projections into corresponding feature spaces for the set of training data subsets. The computing system 110 may project each partition of the training dataset into a different feature space of the set of feature spaces. For example, the computing system 110 may project the first training data subset into the first feature space, may project the second training data subset into the second feature space, and so on. Projecting a training data subset into a feature space may involve representing data included in the training data subset in terms of parameters of the feature space. For example, the first training data subset may be represented by or include a first set of parameters, and projecting the first training data subset into the first feature space may involve representing the data, or indications thereof, included in the first training subset in terms of a second set of parameters associated with the first feature space. The computing system 110 may determine projections of each training data subset into corresponding feature spaces.

At block 430, the computing system 110 extracts training features including indications of similarity between the projections. In some embodiments, the training features may include one or more training feature subsets. Each training feature subset of the one or more training feature subsets may include at least a subset of the indications of similarity. For example, each training feature subset may include one or more indications of similarity between projections of data, or indications thereof, from a common training data subset. In a particular example, the computing system 110 may extract a first training feature subset from the first training data subset projected into the first feature space. The first training feature subset may include indications of similarity between each pair of data points included in the first training data subset.

In some embodiments, the computing system 110 may aggregate the training feature subsets to generate the extracted features. For example, the first nearest neighbor model may generate the first training feature subset, the second nearest neighbor model may generate a second training feature subset, and so on. The computing system 110 can aggregate the first training feature subset, the second training feature subset, and so on to generate the training features. Aggregating the training feature subsets may involve augmenting (e.g., combining) the first training feature subset with the remaining training feature subsets, processing the augmented training feature subsets by, for example, de-duplicating the augmented training feature subsets, pruning the augmented training feature subsets, ordering the augmented training feature subsets, and the like.

At block 440, the computing system 110 trains each nearest neighbor model of a set of nearest neighbor models using the extracted training features. The computing system 110 may use the augmented training feature subsets to train the set of nearest neighbor models. In other embodiments, the computing system 110 may train each nearest neighbor model with a corresponding training feature subset of the training feature subsets. In some embodiments, the trained nearest neighbor models may retain, or may otherwise be configured to recall, relative differences between projections of training data points, or indications thereof, included in the corresponding training data subset.

Examples of Data Flow for Enhancing a Nearest Neighbor Algorithm

Figure 5:
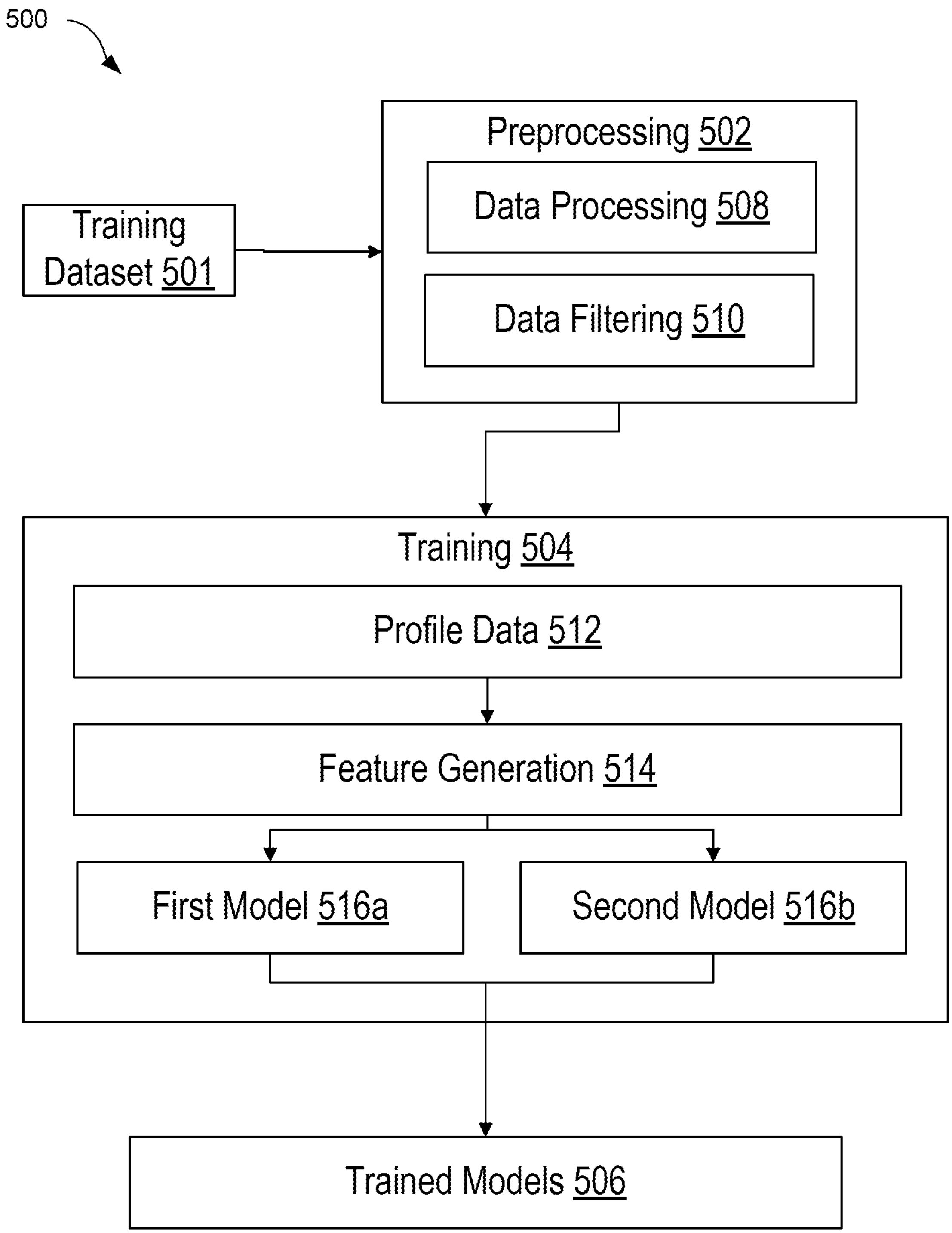
FIG. 5 is an example of a data flow diagram for enhancing a nearest neighbor algorithm using a set of parallel models according to an embodiment.

FIG. 5 is an example of a data flow diagram 500 for enhancing a computer service using a set of models according to an embodiment. In some embodiments, the data flow diagram 500 may illustrate data flow for training one or more nearest neighbor models for enhancing a nearest neighbor algorithm. In some embodiments, the operations and/or techniques described with respect to the data flow diagram 500 may be performed using Java, Spark, Python, or any combination thereof. As illustrated, the data flow diagram 500 may include a training dataset 501, preprocessing 502, training 504, and trained models 506. The training dataset 501 may include historical data and/or real-time data and may originate from a data store, a clickstream, and other suitable sources for data included in the training dataset 501. In a particular example, the training dataset 501 may be or include historical interaction data or log message data.

The training dataset 501 may be transmitted to a preprocessing service (e.g., the preprocessing 502) to be preprocessed or otherwise prepared for use in training one or more nearest neighbor models. The preprocessing 502 may involve data processing 508, data filtering 510, and other preprocessing operations for the training dataset 501. The data processing 508 may involve adjusting data included in the training dataset 501 to allow the data to be processed or otherwise used by the one or more nearest neighbor models. In a particular example, the data processing 508 can involve replacing null strings and null numerical values with placeholders that can be processed, converting yes or no values to true or false values, and the like. The data filtering 510 may involve removing rows of data or other portions of the training dataset 501. In a particular example, the data filtering 510 may remove rows of data with no information, with corrupted information, and the like. The data filtering 510 may additionally involve feature preprocessing such as identifying portions of data included in the training dataset 501 as text: lower case, rstrip, lstrip, etc.

The preprocessed training dataset may be transmitted to a training service (e.g., training 504) to train the one or more nearest neighbor models using the preprocessed training dataset. The training 504 may include or involve profile data 512, feature generation 514, a first model 516*a*, a second model 516*b*, and other suitable components or services for the training 504. The profile data 512 may involve aggregating the preprocessed training dataset into a data profile, cleaning the data profile, labeling the data profile, etc. In some embodiments, the profile data 512 may involve labeling at least a subset of the data included in the preprocessed training dataset based on an origination of each data point of the subset.

The feature generation 514 may involve vectorizing the profile data 512 and/or the preprocessed training dataset. The feature generation 514 may generate one or more vectors based on the profile data 512 and/or the preprocessed training dataset using TFIDF vectorization or other similar vectorization operations. Additionally, each data point in the resulting vector (e.g., and from the training dataset 501) may be assigned an index value to facilitate tracking of each data point. The vector can be split into N number of training data subsets such that N corresponds to the number of nearest neighbor models to be trained. As illustrated, N may be two since a first model 516*a* and a second model 516*b* are illustrated as being trained using the vector, or N training data subsets based on the vector, from the feature generation 514. The training 504 may involve training the first model 516*a* and the second model 516*b* by extracting features from the training data subsets processed by the first model 516*a* and the second model 516*b*, respectively.

In response to training the first model 516*a* and the second model 516*b*, the training 504 may transmit the trained models to be stored in a data repository such as trained models 506. The trained models 506 data store may retain, for example in computer-based memory, the first model 516*a* and the second model 516*b* in a trained state. The trained state of the respective models may retain the extracted features, such as indications of similarity between projections of data points included in corresponding training data subsets. Additionally, the trained state of the respective models may be configured to recall the indications of similarity between the projections during an inference workflow that is configured to use the trained states of the first model 516*a* and the second model 516*b*.

Figure 6:
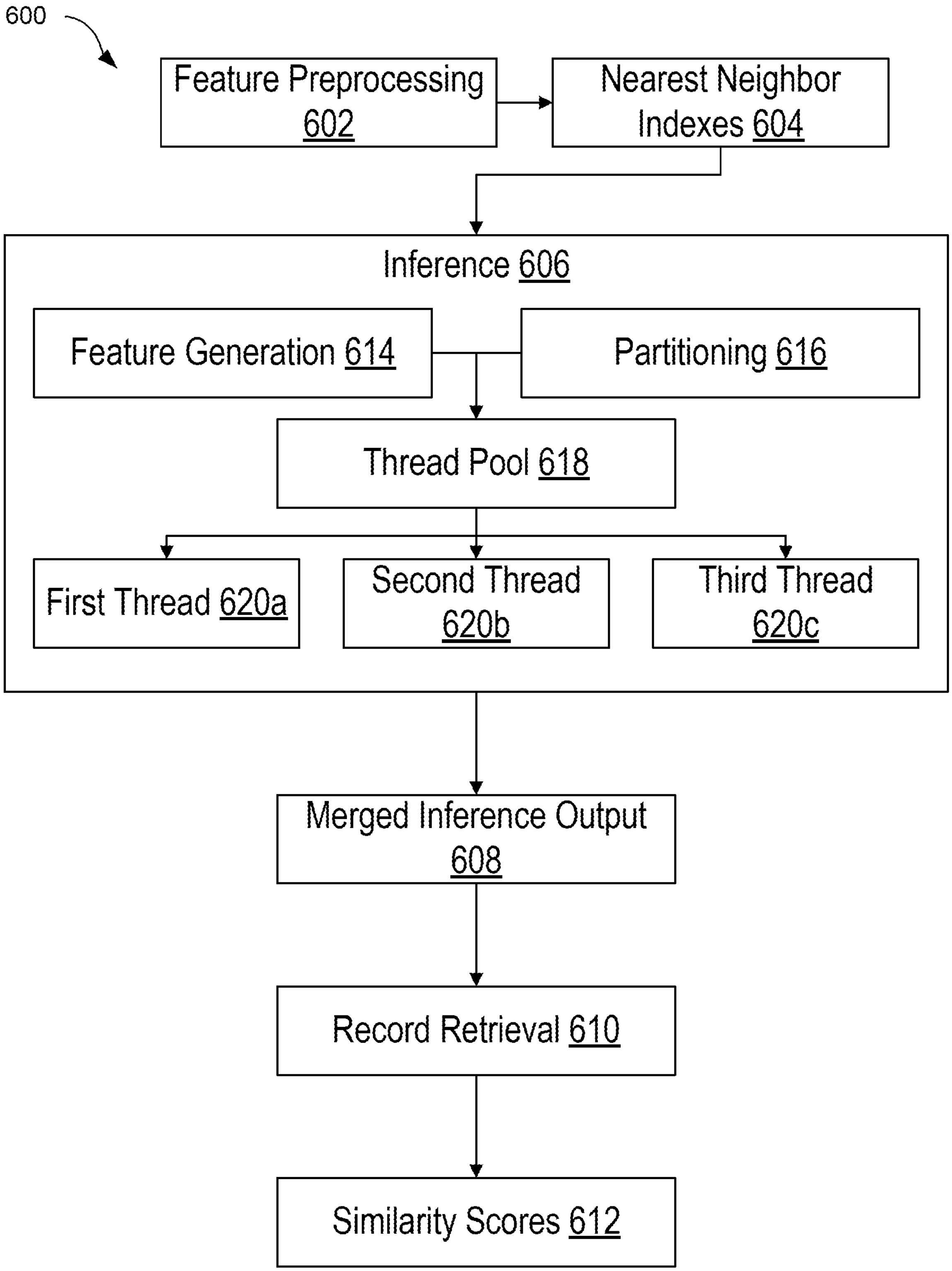
FIG. 6 is another example of a data flow diagram for enhancing a nearest neighbor algorithm using a set of parallel models according to an embodiment.

FIG. 6 is another example of a data flow diagram 600 for enhancing a nearest neighbor algorithm using a set of parallel models according to an embodiment. In some embodiments, the operations and/or techniques described with respect to the data flow diagram 600 may be performed using Java, Spark, Python, or any combination thereof. As illustrated, the data flow diagram 600 may include operations, techniques, or services such as feature preprocessing 602, nearest neighbor indexes 604, inference 606, merged inference output 608, record retrieval 610, and similarity scores 612.

The feature preprocessing 602 may involve identifying portions of data included in an inference dataset as text: lower case, rstrip, lstrip, etc. Additionally, the feature preprocessing 602 may involve receiving one or more queries, requests, or the like from an entity that may desire to receive indications of similarity between data points included in the inference dataset. The nearest neighbor indexes 604 may involve receiving the trained nearest neighbor models, and associated information such as the TFIDF vectorization of the training dataset 501, etc., and extracting or inferring indexes from the trained nearest neighbor models and associated information to be applied to the inference dataset. The preprocessed inference dataset with the applied nearest neighbor indexes may be transmitted to an inference service (e.g., the inference 606) for processing.

The inference 606 may involve operations, techniques, services, and the like such as feature generation 614, partitioning 616, a thread pool 618, a set of threads 620*a-c*, etc. The feature generation 614 may involve generating or identifying features based on the preprocessed inference dataset. The features may be generated or identified using one or more TFIDF techniques that can be applied to queries submitted based on the inference dataset. The partitioning 616 can involve partitioning data included in the inference dataset, partitioning queries submitted based on the inference dataset, and the like. The inference dataset can be partitioned based on a number of threads, which may correspond to a number of nearest neighbor models, anticipated to be used to process the inference dataset. In some embodiments, the inference dataset may be partitioned based on one or more queries submitted based on the inference dataset. For example, a set of five queries may be submitted to request information based on the inference dataset, and the partitioning 616 can involve partitioning the set of five queries by query instance, query type, or the like. Additionally, the partitioning 616 can involve partitioning the inference dataset based on the partitioned queries. For example, the partitioning 616 can involve partitioning the set queries into five different queries, and the partitioning 616 can involve partitioning the inference dataset into five subsets of inference data, which may be further partitioned based on the number of nearest neighbor models to be used for processing the inference dataset, the set of queries, and the like.

The thread pool 618 may involve selecting, determining, generating, etc. a number of threads for processing the inference dataset, the queries, and the like. For example, the thread pool 618 may involve identifying a number of inference data subsets, a number of queries, a number of nearest neighbor models, etc., and determining, based on identifying the above numbers, the number of threads to generate and/or use to execute the nearest neighbor models. As illustrated in the data flow diagram 600, the thread pool 618 generates three threads: a first thread 620*a*, a second thread 620*b*, and a third thread 620*c*, though other suitable numbers (e.g., less than three or more than three) of threads are possible to be generated with respect to the thread pool 618.

In some embodiments, the first thread 620*a*, the second thread 620*b*, and/or the third thread 620*c* may be or include computer-executable code in Python that can be executed to run the nearest neighbor models. In a particular example, the first thread 620*a* may be configured to execute a first nearest neighbor model, the second thread 620*b* may be configured to execute a second nearest neighbor model, and/or the third thread 620*c* may be configured to execute a third nearest neighbor model. Additionally or alternatively, the first thread 620*a*, the second thread 620*b*, and the third thread 620*c* may be configured to execute multiple configurations of the first nearest neighbor model, the second nearest neighbor model, and the third nearest neighbor model, respectively. For example, the first thread 620*a* may execute the first nearest neighbor model N number of times corresponding to a number of queries associated with the inference dataset, the second thread 620*b* may execute the second nearest neighbor model N number of times corresponding to the number of queries associated with the inference dataset, and so on. In other embodiments, each thread may be configured to execute one query submitted for the inference dataset. For example, the first thread 620*a* may be configured to execute a first query, the second thread 620*b* may be configured to execute a second query, and so on without regard to which nearest neighbor model the respective thread executes.

In response to each thread executing, outputs from each thread may be merged to generate the merged inference output 608. Each output from the threads may be separately generated, for example, in a different feature space corresponding to a different nearest neighbor model or to a different inference data subset. The outputs may be merged, or aggregated, since the different feature spaces may be compatible with one another such that merging the outputs may not affect a quality, volume, or the like of the merged inference output 608. Additionally or alternatively, and in response to merging the outputs, the merged inference output 608 may be cleaned, ordered, pruned, and the like to refine the merged inference output 608 to provide output tailored to the one or more queries submitted based on the inference dataset.

In some embodiments, the merged inference output 608 may include indications of similarity between projections of data points of the inference dataset in respective feature spaces. The indications of similarity may include distance scores, similarity scores, and the like between the projections. Additionally, the indications may include or reference indexes that can be used to identify data points based on the projections. The record retrieval 610 may use the indications to identify the data points based on the projections. For example, the record retrieval 610 may identify indexes associated with the projections and identify matching indexes in the inference dataset to identify the data points.

The similarity scores 612 can be generated based on the records, such as the data points, retrieved with respect to the record retrieval 610. Similarity weights can be applied to the data points to resolve the relative differences determined by the threads 620*a-c* (e.g., via the nearest neighbor models). Additionally, the data points can be grouped based on an origination of similar data points. For example, if an origination is similar or identical between a pair of data points, the pair of data points may be grouped and may have a similar or identical weight applied to generate the similarity scores 612. Additionally, one or more pairs of similarity scores can be aggregated. For example, scenario scores that may indicate that one or more pairs of data points, or projections thereof, are similar or identical can be aggregated to simplify the similarity scores 612. The similarity scores 612 can be provided, for example via a user interface or other suitable output channel, to an entity in response to receiving the one or more queries and/or the inference database.

Illustrative Systems

Figure 7:
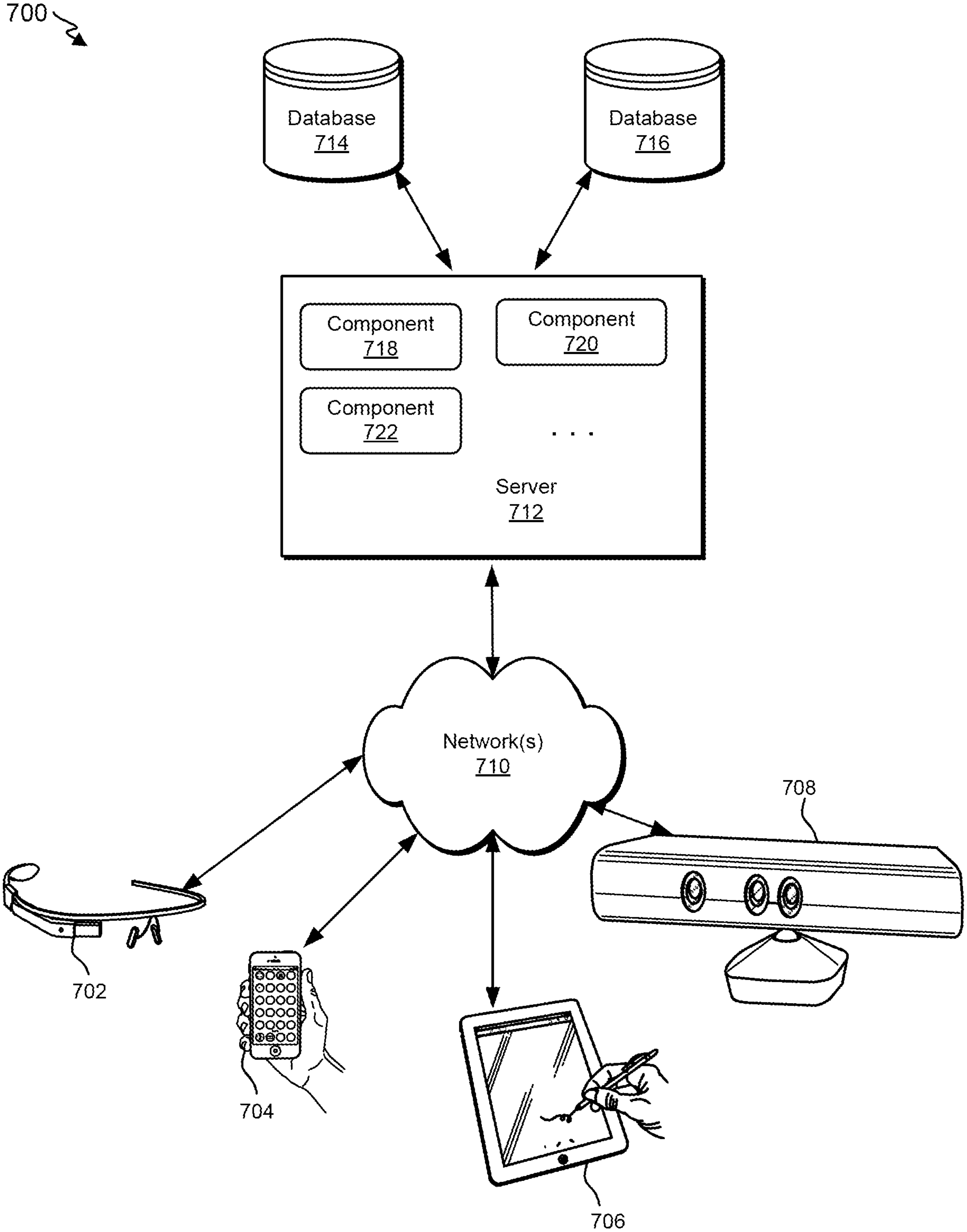
FIG. 7 is a simplified diagram illustrating a distributed system for implementing one of the embodiments.

FIG. 7 depicts a simplified diagram of a distributed system 700 for implementing one of the embodiments. In the illustrated embodiment, distributed system 700 includes one or more client computing devices 702, 704, 706, and 708, which are configured to execute and operate a client application such as a web browser, proprietary client (e.g., Oracle Forms), or the like over one or more network(s) 710. Server 712 may be communicatively coupled with remote client computing devices 702, 704, 706, and 708 via network(s) 710.

In various embodiments, server 712 may be adapted to run one or more services or software applications provided by one or more of the components of the system. In some embodiments, these services may be offered as web-based or cloud services or under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in the figure, the software components 718, 720 and 722 of distributed system 700 are shown as being implemented on server 712. In other embodiments, one or more of the components of distributed system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The embodiment shown in the figure is thus one example of a distributed system for implementing an embodiment system and is not intended to be limiting.

Client computing devices 702, 704, 706, and/or 708 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. In some embodiments, the client computing devices can be special purpose computers that may be programmed or otherwise designed to perform a defined function via an embedded system, or the like, to perform the defined function independent of other tasks. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 702, 704, 706, and 708 may be any other electronic device, such as a thin-client computer, an Internet-enabled gaming system (e.g., a Microsoft Xbox gaming console with or without a Kinect® gesture input device), and/or a personal messaging device, capable of communicating over network(s) 710.

Although distributed system 700 is shown with four client computing devices, any number of client computing devices may be supported. Other devices, such as devices with sensors, etc., may interact with server 712.

Network(s) 710 in distributed system 700 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 710 can be a local area network (LAN), such as one based on Ethernet, Token-Ring and/or the like. Network(s) 710 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE)

802.11 suite of protocols, Bluetooth®, and/or any other wireless protocol); and/or any combination of these and/or other networks.

Server 712 may be composed of one or more general purpose computers, special purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 712 may be adapted to run one or more services or software applications described in the foregoing disclosure. For example, server 712 may correspond to a server for performing processing described above according to an embodiment of the present disclosure.

Server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Examples of database servers include without limitation those commercially available from Oracle, Microsoft, Sybase, IBM (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more databases 714 and 716. Databases 714 and 716 may reside in a variety of locations. By way of example, one or more of databases 714 and 716 may reside on a non-transitory storage medium local to (and/or resident in) server 712. Alternatively, databases 714 and 716 may be remote from server 712 and in communication with server 712 via a network-based or dedicated connection. In one set of embodiments, databases 714 and 716 may reside in a storage-area network (SAN). Similarly, any necessary files for performing the functions attributed to server 712 may be stored locally on server 712 and/or remotely. In one set of embodiments, databases 714 and 716 may include relational databases, such as databases provided by Oracle, that are adapted to store, update, and retrieve data in response to SQL-formatted commands.

Figure 8:
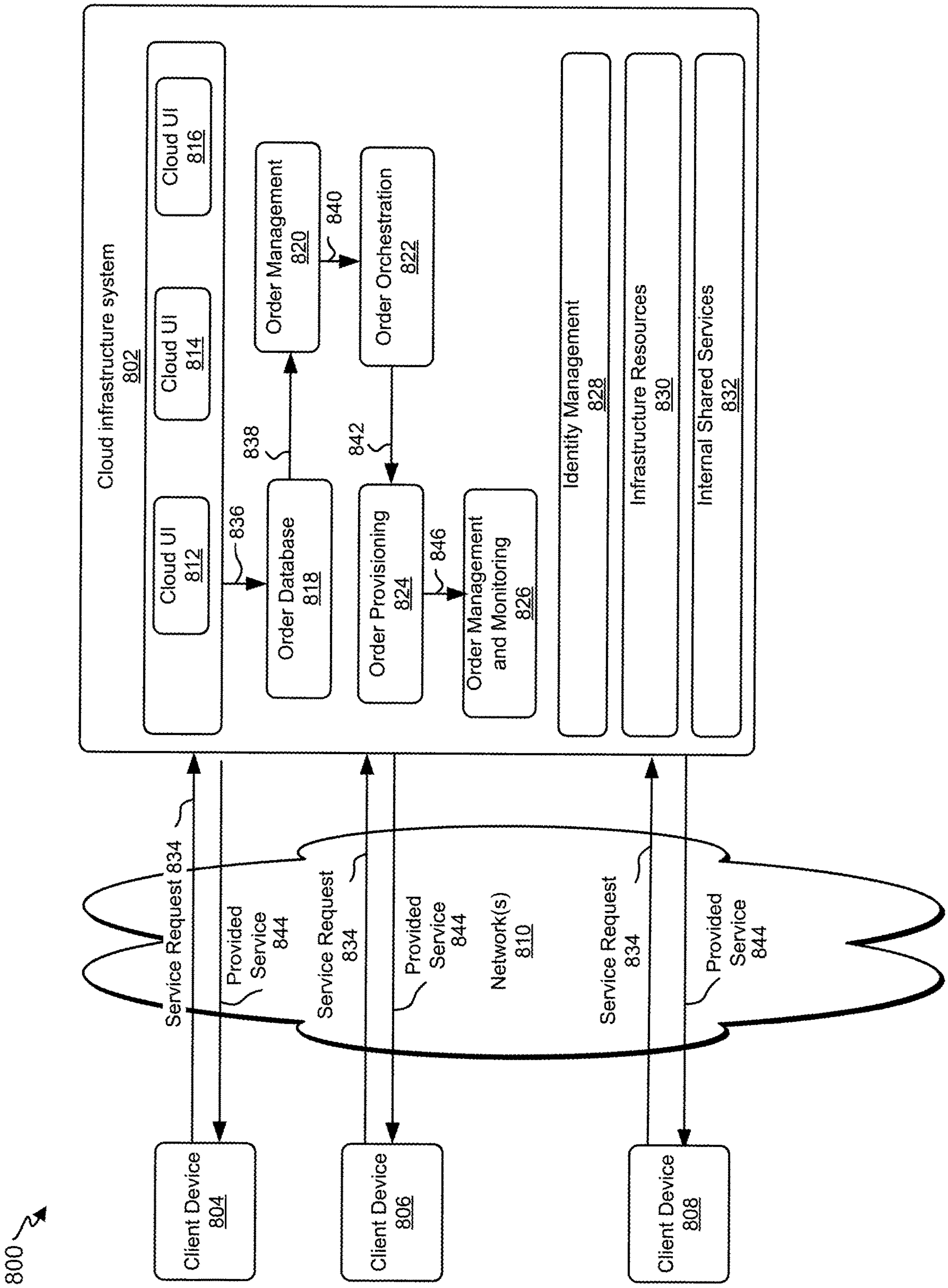
FIG. 8 is a simplified block diagram illustrating one or more components of a system environment according to an embodiment.

FIG. 8 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application (e.g., Oracle Forms), or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components.

Client computing devices 804, 806, and 808 may be devices similar to those described above for 702, 704, 706, and 708.

Although system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols, including those described above for network(s) 810.

Cloud infrastructure system 802 may comprise one or more computers and/or servers that may include those described above for server 712.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can be scaled based on the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, reliable, highly available, and secure manner. The database service offerings may involve computing/storage resources being provisioned and configured for specialized use as needed, and the resources being un-provisioned in scenarios where the resources are not needed or not expected to be needed within a timeframe. An example of such a cloud infrastructure system is the Oracle Public Cloud provided by the present assignee.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and customizable services that can authenticate users and adapt to diverse needs of diverse organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various cloud applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users, and the resources can be re-allocated based on demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, special purpose computers, specialized server computers, server farms, server clusters, or any other appropriate arrangement and/or combination.

In operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816.

At operation 836, the order is stored in order database 818. Order database 818 can be one of several databases operated by cloud infrastructure system 818 and operated in conjunction with other system elements.

At operation 838, the order information is forwarded to an order management module 820. In some instances, order management module 820 may be configured to perform billing and accounting functions related to the order, such as verifying the order, and upon verification, booking the order.

At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of processes associated with each order and applies logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 800 may include an identity management module 828. Identity management module 828 may be configured to provide identity services, such as access management and authorization services in cloud infrastructure system 800. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

Figure 9:
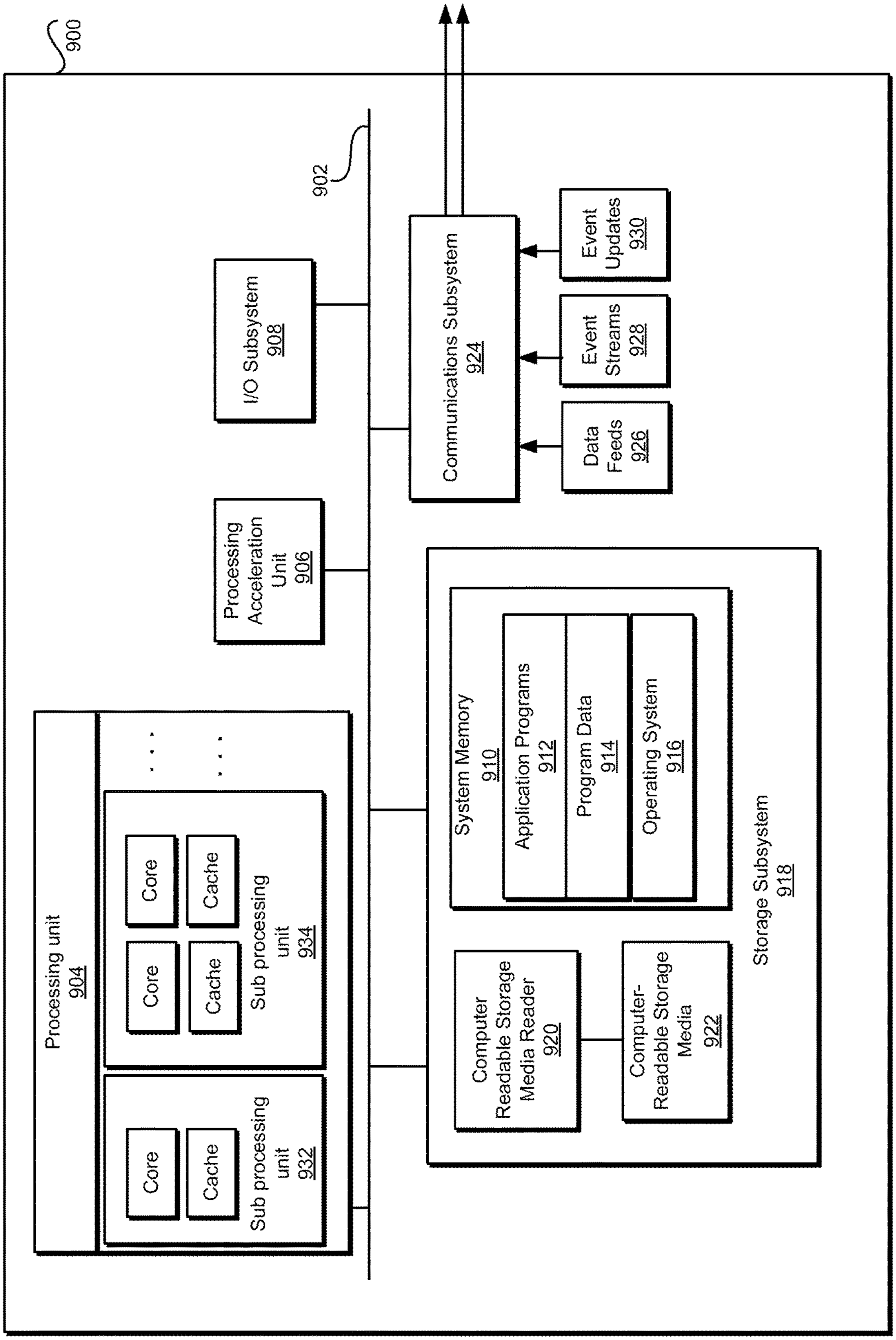
FIG. 9 illustrates an exemplary computer system, in which various embodiments of the present invention may be implemented.

FIG. 9 illustrates an example of a computer system 900, in which various embodiments of the present invention may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 918 may also provide a tangible computer-readable storage medium for storing the basic programming and data constructs that provide the functionality of some embodiments. Software (programs, code modules, instructions) that when executed by a processor provide the functionality described above may be stored in storage subsystem 918. These software modules or instructions may be executed by processing unit 904. Storage subsystem 918 may also provide a repository for storing data used in accordance with the present invention.

Storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 900.

By way of example, computer-readable storage media 922 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1202.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:

generating, by a computing device and before partitioning a first set of data, a uniform feature-set definition for the first set of data;

generating, by the computing device, a training dataset by preprocessing the first set of data according to the uniform feature-set definition into the training dataset comprising a plurality of row-based training data subsets;

training, by the computing device and using the training dataset, a set of partition-specific nearest neighbor models comprising a first number of models by:

partitioning the training dataset into a plurality of row-based training data subsets, wherein the plurality of row-based training data subsets comprises a second number of training data subsets, wherein the second number of training data subsets is the same as the first number of models, wherein a first training data subset of the plurality of row-based training data subsets corresponds to a first feature space of a plurality of feature spaces determined by the computing device, and a second training data subset of the plurality of row-based training data subsets corresponds to a second feature space of the plurality of feature spaces, and wherein the first feature space is compatible with the second feature space such that features from the first feature space are combinable with features from the second feature space;

determining, for each row-based training data subset of the plurality of row-based training data subsets, a plurality of projections of data points into a corresponding feature space, the data points included in each row-based training data subset;

extracting, from the plurality of row-based training data subsets, a plurality of training features comprising one or more training feature subsets, the one or more training feature subsets each comprising one or more indications of similarity between the plurality of projections of data points included in a common row-based training data subset of the plurality of row-based training data subsets; and training each partition-specific nearest neighbor model of the set of partition-specific nearest neighbor models using a different training feature subset of the one or more training feature subsets, wherein each partition-specific nearest neighbor model retains, in a trained state, extracted features comprising indications of similarity between projections of data points in a corresponding row-based training data subset;

partitioning, by the computing device, a second set of data into a plurality of interaction data subsets comprising a third number of data subsets, wherein the third number of data subsets is the same as the first number of models;

allocating, by the computing device, each interaction data subset of the plurality of interaction data subsets to a different partition-specific nearest neighbor model of the set of partition-specific nearest neighbor models;

allocating, by the computing device, the partition-specific nearest neighbor models to different processor cores, nodes, clusters, or execution threads;

generating, by the computing device, the plurality of projections of data points by executing each partition-specific nearest neighbor model of the set of partition-specific nearest neighbor models in parallel using a corresponding interaction data subset of the plurality of interaction data subsets, wherein the plurality of projections of data points comprises a plurality of projection subsets, each projection subset of the plurality of projection subsets corresponding to a different partition-specific nearest neighbor model of the set of partition-specific nearest neighbor models, each projection subset having a corresponding feature space of the plurality of feature spaces, and each projection subset comprising projected data-point representations generated in the corresponding feature space and index values identifying data points corresponding to the projected data-point representations;

determining, by the computing device and for each projection subset of the plurality of projection subsets, a plurality of relative differences comprising distance scores or similarity scores between projected data-point representations in the projection subset;

generating, by the computing device, a merged inference output by merging the plurality of projection subsets and the plurality of relative differences, the merged inference output comprising indications of similarity between projected data-point representations, distance scores or similarity scores for the projected data-point representations, and index values identifying data points corresponding to the projected data-point representations; and providing, by the computing device, the merged inference output in response to a query.

2. The computer-implemented method of claim 1, further comprising determining, by the computing device, a number of partition-specific nearest neighbor models to include in the set of partition-specific nearest neighbor models based on a number of available computational resources.

3. The computer-implemented method of claim 1, further comprising determining, by the computing device, a number of partition-specific nearest neighbor models to include in the set of partition-specific nearest neighbor models based on a size of the training dataset.

4. The computer-implemented method of claim 3, wherein determining the number of partition-specific nearest neighbor models to include in the set of partition-specific nearest neighbor models includes:

determining an optimal size for each training data subset of the plurality of row-based training data subsets; and determining the number of partition-specific nearest neighbor models to include in the set of partition-specific nearest neighbor models to correspond to the optimal size for each training data subset of the plurality of row-based training data subsets.

5. The computer-implemented method of claim 1, wherein providing the merged inference output of the set of partition-specific nearest neighbor models includes:

determining a set of weights, each weight of the set of weights corresponding to a different projection of the plurality of projections of data points; and applying the set of weights to the plurality of projections of data points to resolve relative differences included in the plurality of projections.

6. The computer-implemented method of claim 1, wherein the one or more indications of similarity between the plurality of projections of data points included in the common row-based training subset of the plurality of row-based training data subsets includes one or more cosine similarities, one or more Minkowski distances, or one or more Jaccard similarities between the plurality of projections of data points included in the common row-based training data subset of the plurality of row-based training data subsets.

7. The computer-implemented method of claim 1, wherein determining the plurality of relative differences between each projection of the plurality of projection subsets includes determining a cosine similarity, a Minkowski distance, or a Jaccard similarity between each projection included in a respective projection subset of the plurality of projection subsets.

8. A non-transitory machine-readable storage medium comprising a computer-program product that includes instructions configured to cause a data processing apparatus to perform operations comprising:

generating, by a computing device and before partitioning a first set of data, a uniform feature-set definition for the first set of data;

generating, by the computing device, a training dataset by preprocessing the first set of data according to the uniform feature-set definition into the training dataset comprising a plurality of row-based training data subsets;

training, by the computing device and using the training dataset, a set of partition-specific nearest neighbor models comprising a first number of models by:

partitioning the training dataset into a plurality of row-based training data subsets, wherein the plurality of row-based training data subsets comprises a second number of training data subsets, wherein the second number of training data subsets is the same as the first number of models, wherein a first training data subset of the plurality of row-based training data subsets corresponds to a first feature space of a plurality of feature spaces determined by the computing device, and a second training data subset of the plurality of row-based training data subsets corresponds to a second feature space of the plurality of feature spaces, and wherein the first feature space is compatible with the second feature space such that features from the first feature space are combinable with features from the second feature space;

determining, for each row-based training data subset of the plurality of row-based training data subsets, a plurality of projections of data points into a corresponding feature space, the data points included in each row-based training data subset;

extracting, from the plurality of row-based training data subsets, a plurality of training features comprising one or more training feature subsets, the one or more training feature subsets each comprising one or more indications of similarity between the plurality of projections of data points included in a common row-based training data subset of the plurality of row-based training data subsets; and training each partition-specific nearest neighbor model of the set of partition-specific nearest neighbor models using a different training feature subset of the one or more training feature subsets, wherein each partition-specific nearest neighbor model retains, in a trained state, extracted features comprising indications of similarity between projections of data points in a corresponding row-based training data subset;

partitioning, by the computing device, a second set of data into a plurality of interaction data subsets comprising a third number of data subsets, wherein the third number of data subsets is the same as the first number of models;

allocating, by the computing device, each interaction data subset of the plurality of interaction data subsets to a different partition-specific nearest neighbor model of the set of partition-specific nearest neighbor models;

allocating, by the computing device, the partition-specific nearest neighbor models to different processor cores, nodes, clusters, or execution threads;

generating, by the computing device, the plurality of projections of data points by executing each partition-specific nearest neighbor model of the set of partition-specific nearest neighbor models in parallel using a corresponding interaction data subset of the plurality of interaction data subsets, wherein the plurality of projections of data points comprises a plurality of projection subsets, each projection subset of the plurality of projection subsets corresponding to a different partition-specific nearest neighbor model of the set of partition-specific nearest neighbor models, each projection subset having a corresponding feature space of the plurality of feature spaces, and each projection subset comprising projected data-point representations generated in the corresponding feature space and index values identifying data points corresponding to the projected data-point representations;

determining, by the computing device and for each projection subset of the plurality of projection subsets, a plurality of relative differences comprising distance scores or similarity scores between projected data-point representations in the projection subset;

generating, by the computing device, a merged inference output by merging the plurality of projection subsets and the plurality of relative differences, the merged inference output comprising indications of similarity between projected data-point representations, distance scores or similarity scores for the projected data-point representations, and index values identifying data points corresponding to the projected data-point representations; and providing, by the computing device, the merged inference output in response to a query.

9. The non-transitory machine-readable storage medium of claim 8, wherein the operations further comprise determining a number of partition-specific nearest neighbor models to include in the set of partition-specific nearest neighbor models based on a number of available computational resources.

10. The non-transitory machine-readable storage medium of claim 8, wherein the operations further comprise determining a number of partition-specific nearest neighbor models to include in the set of partition-specific nearest neighbor models based on a size of the training dataset.

11. The non-transitory machine-readable storage medium of claim 10, wherein the operation of determining the number of partition-specific nearest neighbor models to include in the set of partition-specific nearest neighbor models includes:

determining an optimal size for each training data subset of the plurality of row-based training data subsets; and determining the number of partition-specific nearest neighbor models to include in the set of partition-specific nearest neighbor models to correspond to the optimal size for each training data subset of the plurality of row-based training data subsets.

12. The non-transitory machine-readable storage medium of claim 8, wherein the operation of providing the merged inference output the output of the set of partition-specific nearest neighbor models includes:

determining a set of weights, each weight of the set of weights corresponding to a different projection of the plurality of projections of data points; and applying the set of weights to the plurality of projections of data points to resolve relative differences included in the plurality of projections.

13. The non-transitory machine-readable storage medium of claim 8, wherein the one or more indications of similarity between the plurality of projections of data points included in the common row-based training data subset of the plurality of row-based training data subsets includes one or more cosine similarities, one or more Minkowski distances, or one or more Jaccard similarities between the plurality of projections of data points included in the common row-based training data subset of the plurality of row-based training data subsets.

14. The non-transitory machine-readable storage medium of claim 8, wherein the operation of determining the plurality of relative differences between each projection of the plurality of projection subsets includes determining a cosine similarity, a Minkowski distance, or a Jaccard similarity between each projection included in a respective projection subset of the plurality of projection subsets.

15. A system, comprising:

one or more data processors; and a non-transitory computer-readable storage medium containing instructions which, when executed on the one or more data processors, cause the one or more data processors to perform operations comprising:

generating, by a computing device and before partitioning a first set of data, a uniform feature-set definition for the first set of data;

generating, by the computing device, a training dataset by preprocessing the first set of data according to the uniform feature-set definition into the training dataset comprising a plurality of row-based training data subsets;

training, by the computing device and using the training dataset, a set of partition-specific nearest neighbor models comprising a first number of models by:

partitioning the training dataset into a plurality of row-based training data subsets, wherein the plurality of row-based training data subsets comprises a second number of training data subsets, wherein the second number of training data subsets is the same as the first number of models, wherein a first training data subset of the plurality of row-based training data subsets corresponds to a first feature space of a plurality of feature spaces determined by the computing device, and a second training data subset of the plurality of row-based training data subsets corresponds to a second feature space of the plurality of feature spaces, and wherein the first feature space is compatible with the second feature space such that features from the first feature space are combinable with features from the second feature space;

determining, for each row-based training data subset of the plurality of row-based training data subsets, a plurality of projections of data points into a corresponding feature space, the data points included in each row-based training data subset;

extracting, from the plurality of row-based training data subsets, a plurality of training features comprising one or more training feature subsets, the one or more training feature subsets each comprising one or more indications of similarity between the plurality of projections of data points included in a common row-based training data subset of the plurality of row-based training data subsets; and training each partition-specific nearest neighbor model of the set of partition-specific nearest neighbor models using a different training feature subset of the one or more training feature subsets, wherein each partition-specific nearest neighbor model retains, in a trained state, extracted features comprising indications of similarity between projections of data points in a corresponding row-based training data subset;

partitioning, by the computing device, a second set of data into a plurality of interaction data subsets comprising a third number of data subsets, wherein the third number of data subsets is the same as the first number of models;

allocating, by the computing device, each interaction data subset of the plurality of interaction data subsets to a different partition-specific nearest neighbor model of the set of partition-specific nearest neighbor models;

allocating, by the computing device, the partition-specific nearest neighbor models to different processor cores, nodes, clusters, or execution threads;

generating, by the computing device, the plurality of projections of data points by executing each partition-specific nearest neighbor model of the set of partition-specific nearest neighbor models in parallel using a corresponding interaction data subset of the plurality of interaction data subsets, wherein the plurality of projections of data points comprises a plurality of projection subsets, each projection subset of the plurality of projection subsets corresponding to a different partition-specific nearest neighbor model of the set of partition-specific nearest neighbor models, each projection subset having a corresponding feature space of the plurality of feature spaces, and each projection subset comprising projected data-point representations generated in the corresponding feature space and index values identifying data points corresponding to the projected data-point representations;

determining, by the computing device and for each projection subset of the plurality of projection subsets, a plurality of relative differences comprising distance scores or similarity scores between projected data-point representations in the projection subset;

generating, by the computing device, a merged inference output by merging the plurality of projection subsets and the plurality of relative differences, the merged inference output comprising indications of similarity between projected data-point representations, distance scores or similarity scores for the projected data-point representations, and index values identifying data points corresponding to the projected data-point representations; and providing, by the computing device, the merged inference output in response to a query.

16. The system of claim 15, wherein the operations further comprise determining a number of partition-specific nearest neighbor models to include in the set of partition-specific nearest neighbor models based on a number of available computational resources.

17. The system of claim 15, wherein the operations further comprise determining a number of partition-specific nearest neighbor models to include in the set of partition-specific nearest neighbor models based on a size of the training dataset, and wherein the operation of determining the number of partition-specific nearest neighbor models to include in the set of partition-specific nearest neighbor models includes:

determining an optimal size for each training data subset of the plurality of row-based training data subsets; and determining the number of partition-specific nearest neighbor models to include in the set of partition-specific nearest neighbor models to correspond to the optimal size for each training data subset of the plurality of row-based training data subsets.

18. The system of claim 15, wherein the operation of providing the merged inference output of the set of partition-specific nearest neighbor models includes:

determining a set of weights, each weight of the set of weights corresponding to a different projection of the plurality of projections of data; and applying the set of weights to the plurality of projections of data points to resolve relative differences included in the plurality of projections.

19. The system of claim 15, wherein the one or more indications of similarity between the plurality of projections of data points included in the common row-based training data subset of the plurality of row-based training data subsets includes one or more cosine similarities, one or more Minkowski distances, or one or more Jaccard similarities between the plurality of projections of data points included in the common row-based training data subset of the plurality of row-based training data subsets.

20. The system of claim 15, wherein the operation of determining the plurality of relative differences between each projection of the plurality of projection subsets includes determining a cosine similarity, a Minkowski distance, or a Jaccard similarity between each projection included in a respective projection subset of the plurality of projection subsets.

* * * * *